United States Patent [19]
An

[11] Patent Number: 5,566,787
[45] Date of Patent: Oct. 22, 1996

[54] METHOD AND APPARATUS FOR CONTROLLING AN ELEVATOR SYSTEM

[75] Inventor: Jong-tae An, Suwon, Rep. of Korea

[73] Assignee: Samsung Electronics Co., Ltd., Kyungki-Do, Rep. of Korea

[21] Appl. No.: 452,011

[22] Filed: May 26, 1995

[30] Foreign Application Priority Data

Aug. 13, 1994 [KR] Rep. of Korea ............... 94-19990

[51] Int. Cl.⁶ .................................................... B66B 1/00
[52] U.S. Cl. ........................................... 187/276; 187/247
[58] Field of Search .............................. 187/276, 380, 187/389, 247; 221/1, 9, 2, 7, 13

[56] References Cited

U.S. PATENT DOCUMENTS

| | | | |
|---|---|---|---|
| 4,860,207 | 8/1989 | Kubo | 187/247 |
| 5,254,813 | 10/1993 | Hirashiki | 187/247 |
| 5,409,085 | 4/1995 | Fujino et al. | 187/247 |

*Primary Examiner*—Kenneth Noland
*Attorney, Agent, or Firm*—Sughrue, Mion, Zinn, Macpeak & Seas

[57] ABSTRACT

A method and apparatus is provided whereby several operations are simultaneously performed when transferring an object to a desired destination by controlling the output of a microcomputer using an elevator system. The method includes the steps of: vertically transferring a vertical transfer device to a predetermined position of the object according to a predetermined first control signal output from the microcomputer; starting to horizontally transfer a horizontal transfer device to the position of the object according to a predetermined second control signal output from the microcomputer and completing the operation of the horizontal transfer device according to a first external control signal; and starting to insert or withdraw the object into or from the destination according to a third control signal output from the microcomputer and completing the operation for inserting or withdrawing the object into or from the destination according to a second external control signal. The operations for each component of the elevator system are performed simultaneously, by controlling the output of the microcomputer according to the first external control signal.

8 Claims, 3 Drawing Sheets

METHOD AND APPARATUS FOR CONTROLLING AN ELEVATOR SYSTEM

BACKGROUND OF THE INVENTION

The present invention relates to a method and apparatus for controlling an elevator system, and more particularly, to a method and apparatus in which a series of operations required for transferring an object to a desired destination using the elevator system are performed at the same time.

Generally, when transferring an object, such as an optical disk, to a desired destination using an elevator system, the operation mechanism of the elevator system is divided according to each component of the elevator system. FIG. 1 is a diagram for illustrating the respective operations of the elevator system. The operations of a disk changer for inserting and withdrawing a disk will be described below as an example.

An elevator system 100 for transferring a disk to insert the disk into a desired position or to withdraw the disk from a specific position comprises a plurality of disk racks 130 and 140, a vertical transfer device 110 moving vertically with respect to disk racks 130 and 140, a horizontal transfer device 120 moving laterally with respect to disk racks 130 and 140, and an inserting/withdrawing device (not shown) for inserting or withdrawing a predetermined disk into or from disk racks 130 and 140.

According to the conventional method, a series of operations involving each component of the elevator system is performed, resulting in the insertion or withdrawal of a predetermined disk into or from the desired position. Because the operations are performed in succession, excessive time is required for performing the method. That is, when any disk put in disk rack 130 is withdrawn, vertical transfer device 110 is first vertically transferred to the position of a predetermined disk. After the operation of vertical transfer device 110 is completed, horizontal transfer device 120 is horizontally transferred to the position of the disk. When the operation of horizontal transfer device 120 is completed, the operation for inserting or withdrawing a predetermined disk is performed thereafter.

SUMMARY OF THE INVENTION

To solve the above problem, it is an object of the present invention to provide a method and apparatus for controlling an elevator system in which mechanisms of each component of the elevator system are simultaneously operated, to thereby reduce the time required for transferring an object to the desired position.

To achieve the above object, there is provided a method for controlling an elevator system according to the present invention which includes a vertical transfer motor for driving a vertical transfer device, a horizontal transfer motor for driving a horizontal transfer device and an inserting/withdrawing motor for driving a device for inserting or withdrawing a predetermined object into or from a desired destination, so as to insert or withdraw the predetermined object into or from the desired destination, the method comprising the steps of: (a) vertically transferring the vertical transfer device to the position of the object according to a first control signal when the first control signal for controlling the vertical transfer motor is output from a microcomputer; (b) starting to horizontally transfer the horizontal transfer device to the position of the object according to a second control signal when the second control signal is output from the microcomputer together with the first control signal, and completing the operation of the horizontal transfer device according to a first external control signal; and (c) starting to insert or withdraw the object into or from the destination according to a third control signal when the third control signal for controlling the inserting/withdrawing motor is output from the microcomputer after the steps (a) and (b) are completed, and completing the operation for inserting or withdrawing the object into or from the destination according to a second external control signal.

Also, there is provided an apparatus for controlling an elevator system according to the present invention which includes a vertical transfer motor for driving a vertical transfer device, a horizontal transfer motor for driving a horizontal transfer device and an inserting/withdrawing motor for driving a device for inserting or withdrawing a predetermined object into or from a desired destination, so as to insert or withdraw the predetermined object into or from the destination, the apparatus further comprising: a microcomputer for receiving a predetermined external control signal so as to output predetermined control signals for driving the vertical transfer motor, the horizontal transfer motor and the inserting/withdrawing motor; a control signal generator for outputting a first external control signal according to whether the horizontal transfer device arrives at the destination and for outputting a second control signal according to whether the device for inserting or withdrawing the object arrives at the destination; a switching means for turning the control signal output from the microcomputer on or off according to the external control signal output from the control signal generator; and a motor driver for driving the vertical transfer motor, the horizontal transfer motor and the inserting/withdrawing motor according to the control signal of the microcomputer and the output of the switching means.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
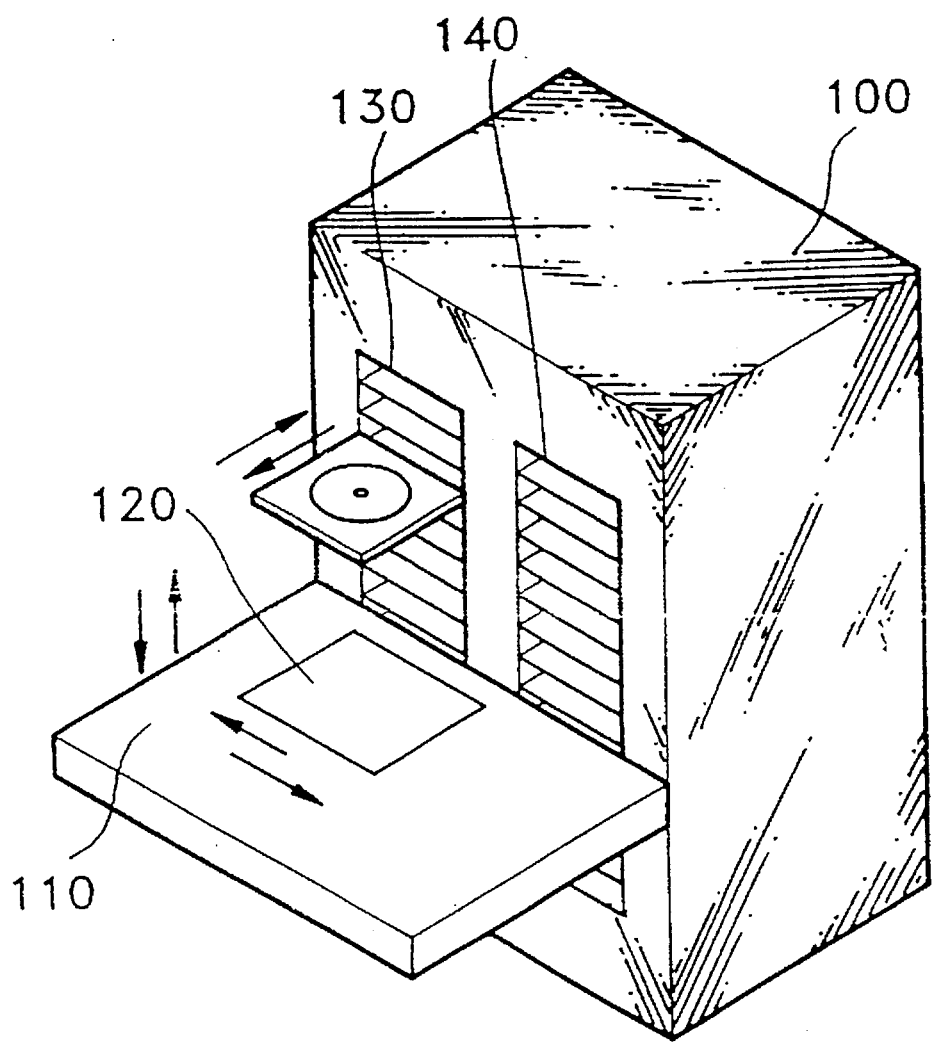
FIG. 1 is a diagram for illustrating the operation of an elevator system.
Figure 2:
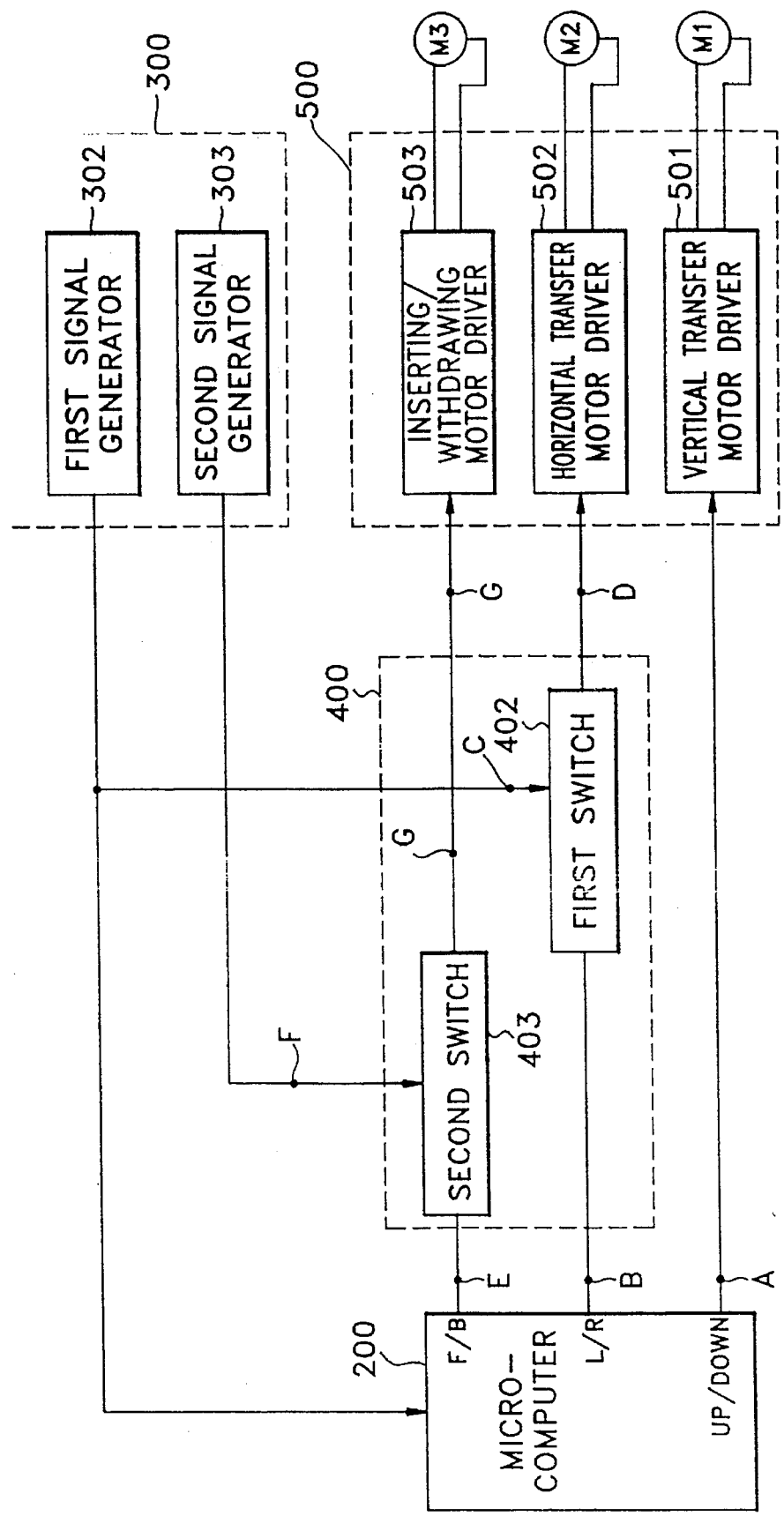
FIG. 2 is a diagram for illustrating an apparatus and a method for controlling an elevator system according to the present invention.

Referring to FIG. 2, the method for controlling the elevator system according to the present invention will be described in relation to the elevator system shown in FIG. 1.

The apparatus for controlling elevator system 100 includes a vertical transfer motor M1 for driving a vertical transfer device 110, a horizontal transfer motor M2 for driving a horizontal transfer device 120, and an inserting/withdrawing motor M3 for driving a device for inserting or withdrawing any disk into or from disk racks 130 and 140, so as to insert or withdraw a predetermined disk into or from the desired disk rack. The apparatus further includes a microcomputer 200 for receiving a predetermined external control signal so as to output a control signal for driving vertical transfer motor M1, horizontal transfer motor M2 and inserting/withdrawing motor M3, a control signal generator 300 for outputting the first external control signal according to whether horizontal transfer device 120 arrives at a predetermined destination and for outputting the second control signal according to whether the device for inserting or withdrawing the disk arrives at a predetermined destination, a switch 400 for switching the control signal output from microcomputer 200 on or off according to the external control signal output from control signal generator 300, and a motor driver 500 for outputting a predetermined driving signal for driving vertical transfer motor M1, horizontal transfer motor M2 and inserting/withdrawing motor M3 according to the output of switch 400.

Figures 3A, 3B, 3C, 3D, 3E, 3F, 3G:
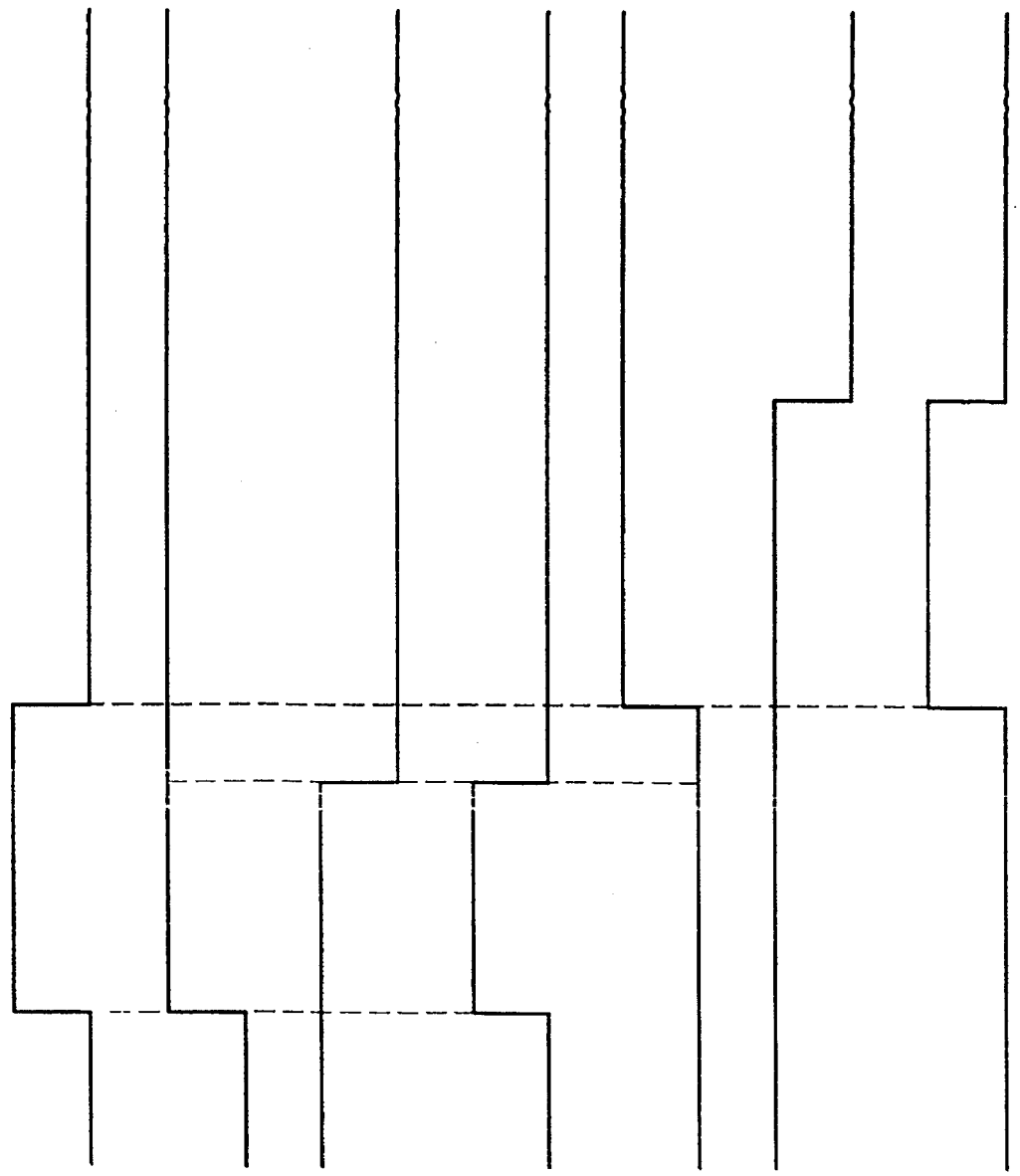
FIGS. 3A–3G represent a timing diagram for the apparatus and method of FIG. 2.

FIGS. 3A–3G represent a timing diagram showing the various waveforms of the operation of the apparatus of FIG. 2. Here, FIG. 3A shows a control signal of microcomputer 200 for controlling vertical transfer device 110. The signal corresponds to reference character A shown in FIG. 2 and initiates the operation of vertical transfer device 110. FIG. 3B shows a control signal of microcomputer 200 for controlling horizontal transfer device 120. The signal corresponds to reference character B shown in FIG. 2 and initiates the operation of horizontal transfer device 120. FIG. 3C shows a first external control signal output from a first control signal generator 302 and corresponds to reference character C shown in FIG. 2. FIG. 3D shows a signal output from a first switch 402 and corresponds to reference character D shown in FIG. 2. FIG. 3E shows a control signal of microcomputer 200 for controlling the device for inserting or withdrawing the disk into or from racks 130 and 140 and corresponds to reference character E shown in FIG. 2. FIG. 3F shows a second external control signal output from a second control signal generator 303 and corresponds to reference character F shown in FIG. 2. FIG. 3G shows a signal output from a second switch 403 and corresponds to reference character G shown in FIG. 2.

Referring to FIGS. 1 to 3, the operation of the present invention will be described.

In order to withdraw a predetermined disk from disk rack 130 of elevator system 100, microcomputer 200 outputs first control signal A for controlling vertical transfer device 110 and second control signal B for controlling horizontal transfer device 120, at the same time. First control signal A output from microcomputer 200 drives vertical transfer motor M1 via a vertical transfer motor driver 501 so as to vertically transfer vertical transfer device 110 to a predetermined destination.

Second control signal B output from microcomputer 200 drives horizontal transfer motor M2 via first switch 402 and horizontal transfer motor driver 502. When horizontal transfer device 120 arrives at a predetermined destination, the first external control signal output from first control signal generator 302 controls first switch 402 and microcomputer 200 so as to complete the operation of horizontal transfer device 120, and outputs third control signal E from microcomputer 200, for controlling the device for inserting or withdrawing a predetermined disk into or from disk rack 130.

Third control signal E output from microcomputer 200 drives inserting/withdrawing motor M3 via second switch 403 and an inserting/withdrawing motor driver 503. Also, the second external control signal output from a second external control signal generator 303 controls second switch 403 so that the operation for inserting or withdrawing the disk is completed.

As described above, the method and apparatus for controlling the elevator system according to the present invention performs the operations carried out by each component of elevator system, at the same time, by controlling the output of a microcomputer according to an external control signal, thereby reducing the time required for the transfer of an object.

What is claimed is:

1. A method for controlling an elevator system which includes a vertical transfer motor for driving a vertical transfer device, a horizontal transfer motor for driving a horizontal transfer device and an inserting/withdrawing motor for driving a device for inserting or withdrawing a predetermined object into or from a desired destination, so as to insert or withdraw the predetermined object into or from the desired destination, said method comprising the steps of:

(a) vertically transferring said vertical transfer device to the position of the predetermined object according to a first control signal when the first control signal for controlling said vertical transfer motor is output from a microcomputer;

(b) starting to horizontally transfer said horizontal transfer device to the position of said predetermined object according to a second control signal when the second control signal is output from said microcomputer together with said first control signal, and completing the operation of said horizontal transfer device according to a first external control signal; and (c) starting to insert or withdraw said predetermined object into or from said destination according to a third control signal when the third control signal for controlling said inserting/withdrawing motor is output from said microcomputer after said steps (a) and (b) are completed, and completing the operation for inserting or withdrawing said predetermined object into or from the destination according to a second external control signal.

2. A method for controlling an elevator system as claimed in claim 1, wherein said first external control signal turns the second control signal output from said microcomputer on or off according to whether said horizontal transfer device arrives at the destination so as to control the operation of said horizontal transfer device, and controls said microcomputer to output a third control signal for driving said inserting/withdrawing motor when said first external control signal turns off the second control signal output from said microcomputer.

3. A method for controlling an elevator system as claimed in claim 1, wherein said second external control signal turns the third control signal output from said microcomputer on or off according to whether the device for inserting or withdrawing the object arrives at said destination, so as to control the driving of said inserting/withdrawing motor.

4. An apparatus for controlling an elevator system, said apparatus comprising:

a vertical transfer motor for driving a vertical transfer device;

a horizontal transfer motor for driving a horizontal transfer device;

an inserting/withdrawing motor for driving a device for inserting or withdrawing a predetermined object into or from a desired destination, so as to insert or withdraw the predetermined object into or from said destination;

a microcomputer for receiving a predetermined external control signal so as to output predetermined control signals for driving said vertical transfer motor, said horizontal transfer motor and said inserting/withdrawing motor;

a control signal generator for outputting a first external control signal according to whether said horizontal transfer device arrives at said destination and for outputting a second control signal according to whether said device for inserting or withdrawing the object arrives at said destination;

a switching means for turning at least one of the predetermined control signals output from said microcomputer on or off according to at least one the first external control signal and the second external control signal output from said control signal generator; and a motor driver for driving said vertical transfer motor, said horizontal transfer motor and said inserting/withdrawing motor according to the predetermined control signals output by said microcomputer and the output of said switching means.

5. An apparatus according to claim 4, wherein said microcomputer begins to output the predetermined control signal for driving said vertical transfer motor and the predetermined control signal for driving said horizontal transfer motor at the same time.

6. An apparatus according to claim 5, wherein said switching means begins application of the predetermined control signal for driving said horizontal transfer motor to said motor driver at the same time as said microcomputer begins application of the predetermined control signal for driving said vertical transfer motor to said motor driver.

7. An apparatus according to claim 4, wherein a portion of time during which said microcomputer outputs the predetermined control signal for driving said vertical transfer motor coincides with a portion of time during which said microcomputer outputs the predetermined control signal for driving said horizontal transfer motor.

8. An apparatus according to claim 7, wherein a portion of time during which said switching means applies the predetermined control signal for driving said horizontal transfer motor to said motor driver coincides with a portion of time during which said microcomputer applies the predetermined control signal for driving said vertical transfer motor to said motor driver.

* * * * *